(12) United States Patent
Peng

(10) Patent No.: US 9,978,409 B2
(45) Date of Patent: May 22, 2018

(54) OFFSET WAVEGUIDE SYSTEM WITH A MODE CONVERTER AND A TAPERED BEND

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 19 days.

(21) Appl. No.: 15/061,453

(22) Filed: Mar. 4, 2016

(65) Prior Publication Data

US 2017/0256277 A1 Sep. 7, 2017

(51) Int. Cl.
*G11B 5/127* (2006.01)
*G11B 5/48* (2006.01)
*G11B 5/60* (2006.01)
*G11B 5/00* (2006.01)
*G11B 5/012* (2006.01)

(52) U.S. Cl.
CPC ............ *G11B 5/4866* (2013.01); *G11B 5/127* (2013.01); *G11B 5/6088* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| 9,384,765 B1* | 7/2016 | Mu ..................... G11B 5/6088 |
| 2004/0208465 A1 | 10/2004 | Logvin et al. |
| 2014/0254335 A1 | 9/2014 | Gage et al. |
| 2015/0109893 A1 | 4/2015 | Jin et al. |
| 2015/0131415 A1 | 5/2015 | Peng |

* cited by examiner

*Primary Examiner* — Brian Butcher
(74) *Attorney, Agent, or Firm* — Hollingsworth Davis, LLC

(57) ABSTRACT

A read/write head has an input coupler that receives light at a fundamental mode from an energy source. A mode converter of the read/write head converts light from the fundamental mode to a higher-order mode. The read/write head has a bent waveguide coupled to the mode converter at an interface. The bent waveguide includes a curve with a taper. The taper nullifies the fundamental mode generated in the curve and recovers the higher-order mode at an output of the bent waveguide. A near-field transducer that receives the output of the bent waveguide is offset from the facet of the input coupler in a cross-track direction.

20 Claims, 10 Drawing Sheets

Section 4-4

Section 5-5

OFFSET WAVEGUIDE SYSTEM WITH A MODE CONVERTER AND A TAPERED BEND

SUMMARY

The present disclosure is related to an offset waveguide system with a mode converter and a tapered bend. In one embodiment, a read/write head has an input coupler with a facet that receives light at a fundamental mode from an energy source. The read/write head has an s-bend waveguide with a first bend coupled to the input coupler at an interface and a second bend that extends from the first bend to a termination of the s-bend waveguide proximate a near-field transducer of the read/write head. The second bend includes a taper. The termination is offset from the facet of the input coupler in a cross-track direction. A branch waveguide is coupled to the s-bend waveguide and the input coupler proximate the interface. The branch waveguide extends away from a media-facing surface of the read/write head and converts the light from the fundamental mode to a higher-order mode that is coupled through the s-bend waveguide.

In another embodiment, a read/write head has an input coupler that receives light at a fundamental mode from an energy source. A mode converter of the read/write head converts light from the fundamental mode to a higher-order mode. The read/write head has a bent waveguide coupled to the mode converter at an interface. The bent waveguide includes a taper that nullifies the fundamental mode generated in the curve and recovers the higher-order mode at an output of the bent waveguide. A near-field transducer that receives the output of the bent waveguide is offset from the facet of the input coupler in a cross-track direction.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Figure 1:
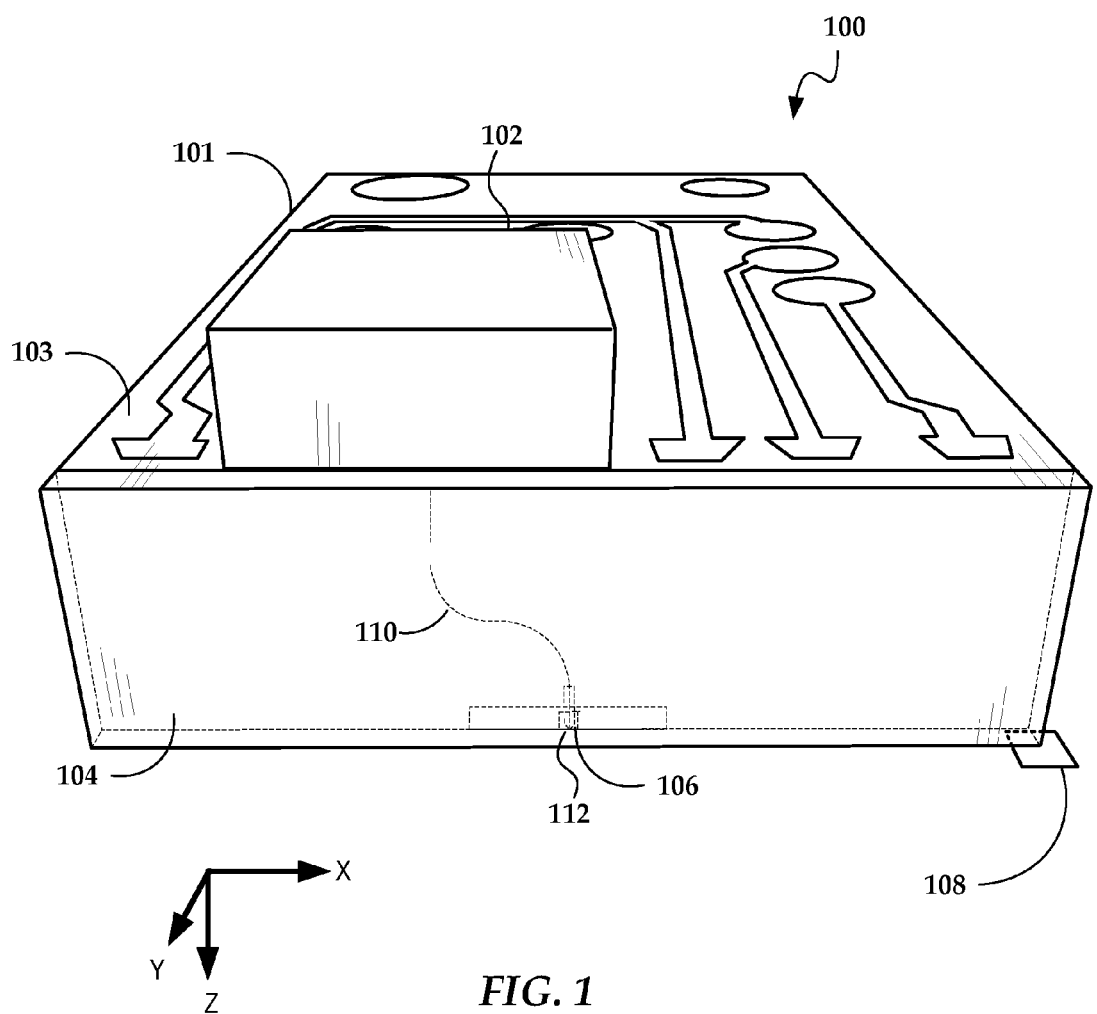
FIG. 1 is a perspective view of a slider assembly according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer of a recording medium (e.g., magnetic disk) at elevated temperatures. The heated area (e.g., hot spot) in the storage layer determines the data bit dimension. One way to achieve a tiny, confined hot spot is to use an optical near-field transducer (NFT), such as a plasmonic optical antenna or an aperture, integrated in an optical waveguide of high contrast in the index of refraction between the waveguide core and its claddings. A magnetic pole is placed in close proximity (e.g., 20-50 nm) to the NFT at the media-facing surface.

One way to launch light into the optical waveguide on a magnetic slider is to bond a light source on a mounting surface (e.g., a top surface) of the slider. Light exiting from a light source, for instance, an edge-emitting laser diode, is coupled into a slider-integrated optical waveguide by an input coupler. The waveguide coupler is part of a light delivery system that delivers light to the NFT located at the air-bearing surface (ABS) of the slider. For example, a channel waveguide may extend in as straight line from the top surface to the ABS.

One issue with a straight-through light path is that it may require the laser to be centered in a cross track direction. In some designs, this requires that a load-beam that supports the slider include a cutout in order to accommodate the laser. Such a cutout can affect mechanical integration and stability of the load beam. Also, due to incomplete coupling from a light source to a waveguide on slider, some stray light will reach the writer region and be absorbed. This can increase laser-induced writer/reader protrusion (LIWP), which complicates maintaining low clearances between the ABS and the recording medium. In order to negate these effects, a cross-track offset light path may be used between the laser and NFT. For various laser diode unit (LDU) configurations, the cross-track offset may range from 20 to 100 μm.

A HAMR light delivery system may use a first, higher-order, transverse electric mode ($TE_{10}$)) to excite a near-field transducer. In some configurations described below, the offset light path will include a bent waveguide portion configured so that the distal end of the waveguide will be centered at slider along cross-track direction. If both ends of the light delivery path are oriented normal to both the laser output and the ABS, a s-bend will be used. However, higher-order modes tend to convert into other order modes, in particular, from a first-higher transverse electric mode, $TE_{10}$, to the fundamental transverse electric mode, $TE_{00}$, due to the intermodal coupling in waveguide bends. The fundamental mode causes multiple adjacent track interference (MATI) in recording, reducing track density. A waveguide with a large curvature at the bends can minimize this conversion. But this may not be practical in some cases, e.g., where a magnetic slider has small dimensions (e.g., below 200 μm) between the top and bottom surface.

Apparatuses and methods are described below that can achieve an offset light path in the given dimensional constraints with high transmission and with $TE_{10}$-to-$TE_{00}$ mode conversion of less than −30 dB, which amounts to about 0.1%. This can be used for a number of different LDU configurations. Such a waveguide system can utilize a relatively low-index core, such as a core formed from tantalum pentoxide ($Ta_2O_5$).

In reference to FIG. 1, a perspective view shows a HAMR recording head 100 according to an example embodiment. The recording head 100 may also be referred to as a slider, read head, write head, read/write head, etc. The recording head 100 includes a laser diode 102 located on mounting surface 103 of a slider body 101. The laser diode may be directly mounted as shown or by way of a submount. In this example, the mounting surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an ABS that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, rhodium, platinum, iridium, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., directly on the surface or in a pocket or cavity) such that the light is emitted in a direction perpendicular to the media-facing surface (along the z-direction in this view).

Figure 2:
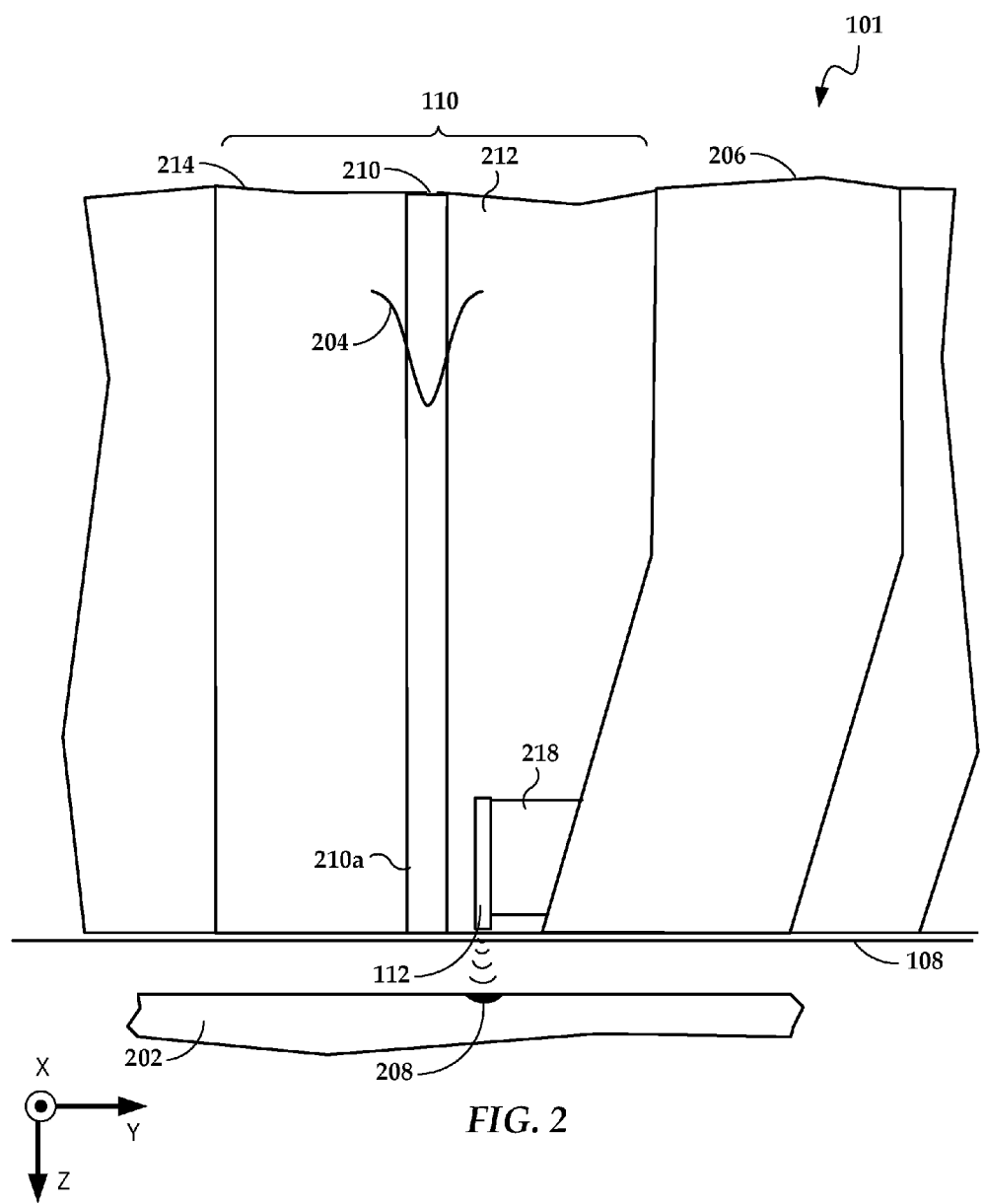
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (y-direction).

The waveguide system 110 includes a core layer 210 surrounded by cladding layers 212, 214. The core layer 210 may be made from dielectric of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon), etc. The cladding layers 212, 214 may each be formed of a dielectric material having a refractive index lower than the core, such as $Al_2O_3$ (aluminum oxide), SiO, $SiO_2$ (silica), SiOxNy (silicon oxynitride), and AlN (aluminum nitride). This arrangement of materials facilitates efficient propagation of light through the waveguide system 110. The waveguide system 110 may include any combination of geometric features described in subsequent figures.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

Figure 3:
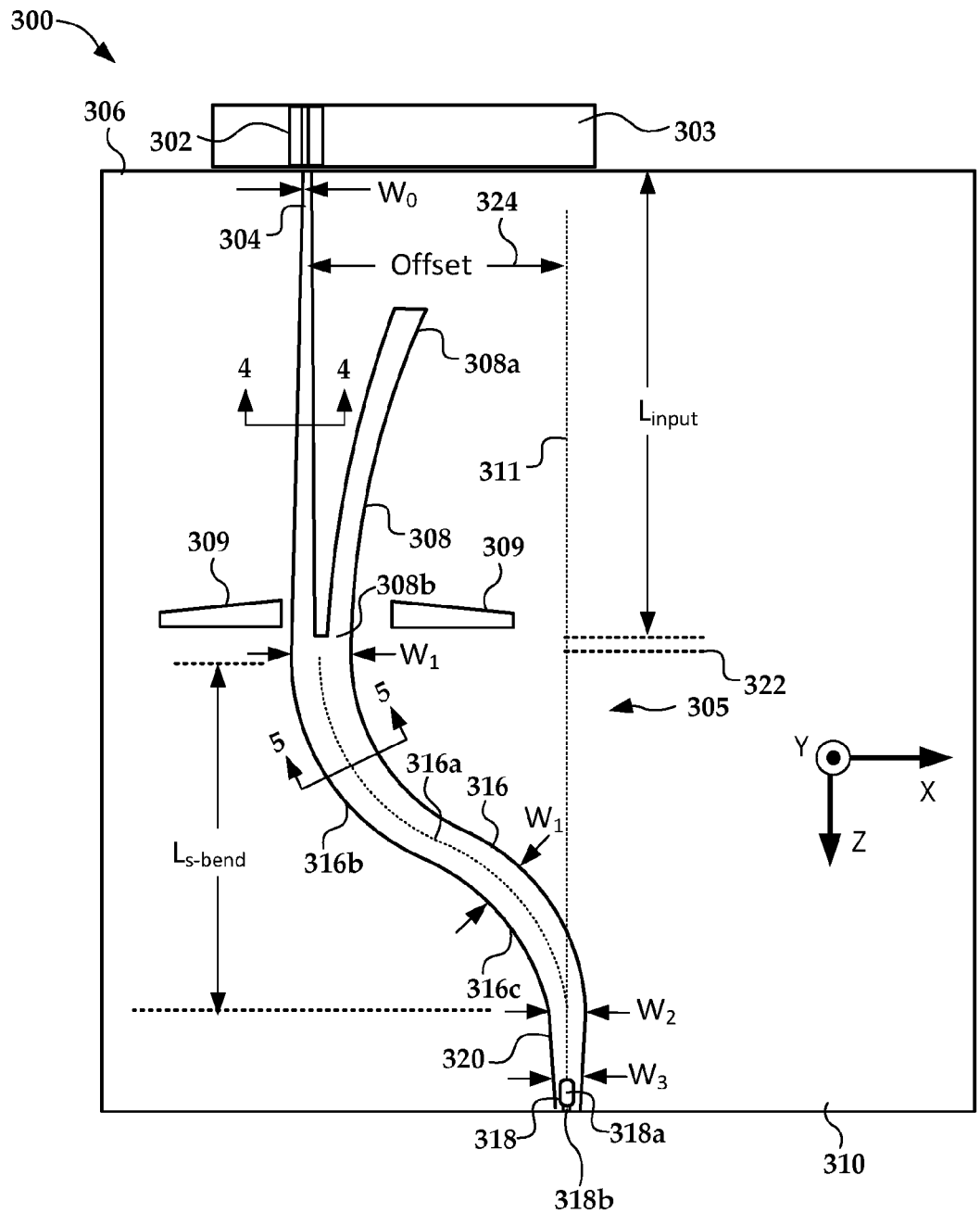
FIG. 3. is a substrate-parallel plane view showing geometry of a slider-integrated waveguide system according to an example embodiment.

In FIG. 3, a substrate-parallel plane view shows geometry of a slider-integrated waveguide apparatus 300 according to an example embodiment. A laser source 302, for instance, an edge-emitting laser diode, mounted on a submount 303, is located on a top surface of a slider body 306. The laser 302 launches light into a waveguide system 305 via a waveguide input coupler 304. The laser source is polarized along the x-direction, exciting a fundamental transverse electric (TE) mode ($TE_{00}$) in the waveguide input coupler.

The fundamental mode, $TE_{00}$, of the light launched into the input coupler 304 is converted into the first higher order mode, $TE_{10}$, with the assistant of a mode converter. In this example, the mode converter is a branch waveguide 308, although other mode converters may be used, e.g., core section using different index materials, split core sections of different length, directional coupler, multimode interference (MMI), s-bend, etc. The branch width at a distal end 308a is wider than that of the input coupler 304, but nearly equal to the width of the input coupler 304 at proximal end 308b near the joint. The distal end 308a of the branch waveguide is well-separated from the input coupler 304. Both the input coupler 304 and branch waveguide 308 are narrow in the cross-track direction and support only a fundamental transverse mode (along the x-direction). As two waveguides are brought together slowly, the light field is gradually coupled into the branch waveguide. At the proximal end 308b of coupler, the two waveguides are combined and a $TE_{10}$ mode is formed. Further details of this type of $TE_{00}$-to-$TE_{10}$ mode converter are described in commonly-owned U.S. Publication 2015/0279394, filed Mar. 25, 2014.

A near-field transducer 318 is placed, e.g., near the core in the cladding layer or inside the core. The near-field transducer 318 is excited by a $TE_{10}$ mode propagating in the output channel waveguide 320 which is proximate the near-field transducer 318. The near-field transducer 318 includes an enlarged portion 318a and peg 318b, the peg 318b facing towards a media-facing surface 310 of the slider 306. The waveguide core width is tapered down slowly (adiabatically) from $W_1$ at the joint to $W_3$ to minimize the conversion from $TE_{10}$ to $TE_{00}$ mode. The width $W_3$ of the output waveguide 320, is chosen to optimize the near-field transducer excitation efficiency.

The coupling efficiency from the laser diode 302 to the input waveguide 304 depends on the mode match there between. This coupling is usually not 100%. In addition, some of coupled light propagating in the waveguide system 305 will also get scattered out of the waveguide system 305, mostly due to waveguide imperfections, e.g., roughness and jaggedness at the waveguide core/cladding interface and along core edges. The light that does not propagate in the waveguide system 305 as a mode is called stray light. A portion of stray light reaches the writer/reader and where it is absorbed, causing writer/reader protrusion. A waveguide blocker may be used to prevent these stray light reach the writer by reflecting and/or absorbing. The waveguide blocker could be somewhat complex, for instance, a frame blocker that surrounds the core on all sides.

Instead of (or in addition to) a waveguide blocker, the waveguide system includes an offset light path. As shown, the offset light path uses a bent (e.g., s-bend) waveguide 316 to bring the output waveguide onto the slider center 311, and allows the ends of the light path to be normal to the top surface and the media-facing surface 310. The s-bend waveguide 316 includes a first bend 316b coupled to the input coupler 304 and a second bend 316c extending from the first bend 316b to a termination of the s-bend waveguide 316 proximate the near-field transducer 318. Because of the s-shape, the first and second bends 316b-c have opposite curvature. As noted above, this allows the laser 302 to be offset from the center 311, thereby minimizing the TGA load-beam cut-out. This promotes TGA mechanical stability and miniaturization. The offset light path also naturally filters out part of the stray light so that a relatively simple waveguide blocker could be used. In this example, reflective or absorptive blockers 309 may be placed at a cross-track offset from the core.

The bent waveguide 316 can induce coupling from higher-order modes (e.g., $TE_{10}$ mode) to fundamental (e.g., $TE_{00}$) mode if the bend curvature is large. The bent waveguide 305 could also yield radiation loss if the bend curvature is large. For example, for magnetic slider that is 180 µm long along the z-direction would have limited space in which to place an s-bend of large radius of curvature. This disclosure provides detail to design an offset light path that fits on current slider of this size while minimizing the coupling of fundamental modes into the output.

There are two physical loss mechanisms using a bent waveguide sector: transition loss and pure bending loss. Transition loss occurs at a discontinuity between two waveguide sections of different curvatures, for instance, between a straight and a bent sector. The transition loss is due to mode field mismatch and lateral offset in the peak field, causing radiation loss and excitations of other order modes. Another aspect is the reflection at the discontinuity between two waveguide sections. Reflection back to the laser cavity will cause mode hopping, resulting in fluctuations and jump in laser output power. Pure bending loss is a result of radiation loss due to phase wave-front deformation in a bent waveguide.

One method to minimize transition loss is lateral shift between two waveguide sectors. This lateral shift is difficult to realize because of the high resolution required in the fabrication. In this example, the s-bend 316 can use a polynomial spiral path to have continuous change in bending curvature along the path. This minimizes intermodal coupling to achieve tightly bent waveguide. A polynomial spiral s-bend 316 can help mitigate the conversion from $TE_{10}$ to $TE_{00}$ mode, for example.

Another issue to consider in the s-bend 316 is intermodal interference. Considering two connected bent sectors of different curvatures, the modes of the second sector can be seen as the linear combination of the modes of the first sector. The $TE_{10}$ mode propagating along the first sector will excite both $TE_{10}$ and $TE_{00}$ mode in the second sector at the joint of two waveguides, assuming that both sectors support only two propagating transverse modes for simplicity. The field in the second sector changes its shape along the bend because the two bend modes have different phase velocities. At a beat length $L_B$, defined as in Equation (1) below, where $\beta_{b1}$ and $\beta_{b2}$ are the propagation constants of the two bend modes, the two bend modes are in phase, and the total field returns to be identical to $TE_{10}$ mode of the first sector.

$$L_B = \frac{2\pi}{\beta_{b1} - \beta_{b2}} \qquad (1)$$

This concept is called matched bends and was originally developed for single mode waveguide bends. Matching is achieved through the interference of the fundamental and the first leaky mode. If the pure bending loss is weak, nearly full transmission over the bend could be obtained, assuming that the matched bend condition is satisfied, which occurs at a discrete number of bending radii for a given bending angle. In this example, where the goal is to minimize the generation of $TE_{00}$ mode, the situation is much complex. The waveguide is no longer single-mode and it at least supports two modes. A method used to obtain at least nearly matched bend will be described in detail below. For HAMR applications the generation of $TE_{00}$ mode should be minimized, since it causes MATI degrading the recording density if the amount of $TE_{00}$ mode is greater than 3%.

To have more space for the bend, the waveguide width tapers from $W_1$ to $W_2$ in a lower part of the s-bend 316. Note that the waveguide can taper in either direction, e.g., $W_1 > W_2$ or $W_1 < W_2$. The taper start position on the s-bend waveguide 316 is optimized to minimize the generation of $TE_{00}$ mode by intermodal interference described above. For example, a waveguide with of a 120 nm thick niobium oxide ($Nb_2O_5$) core, conformally covered with a 100 nm thick alumina ($Al_2O_3$) and with silica ($SiO_2$) top cladding layer is considered. The block diagram in FIGS. 4 and 5 are waveguide cross sections corresponding to section lines 4-4 and 5-5 in FIG. 3.

Figure 4:
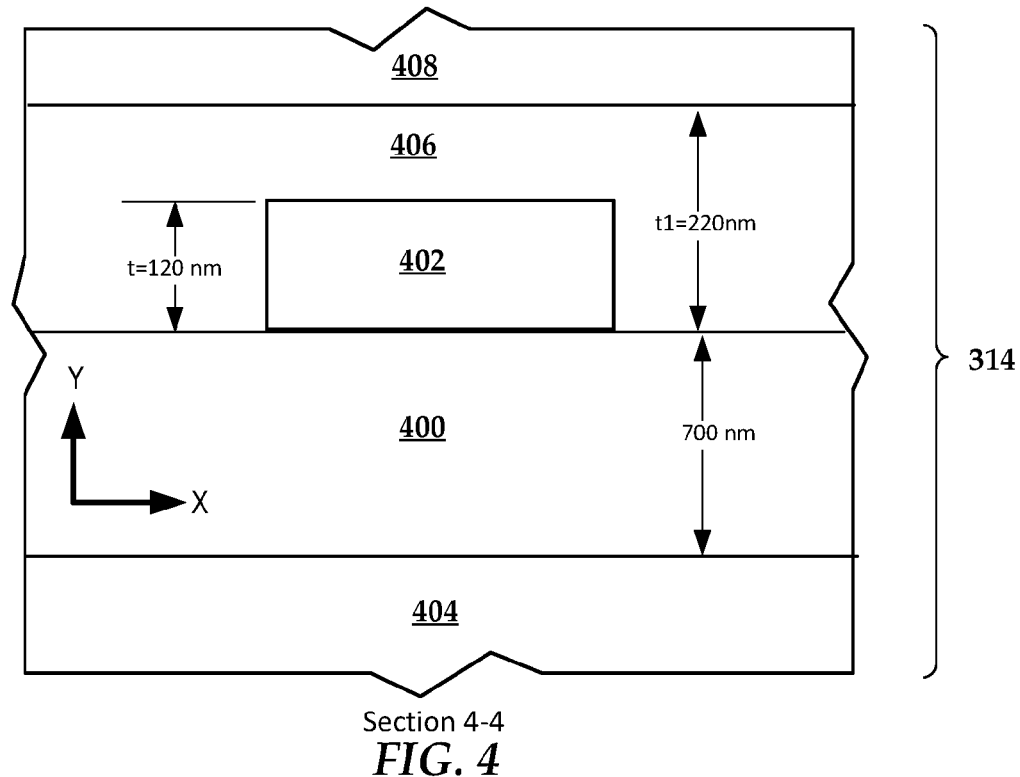
FIG. 4 is a cross-sectional view corresponding to section 4-4 of FIG. 3.
Figure 5:
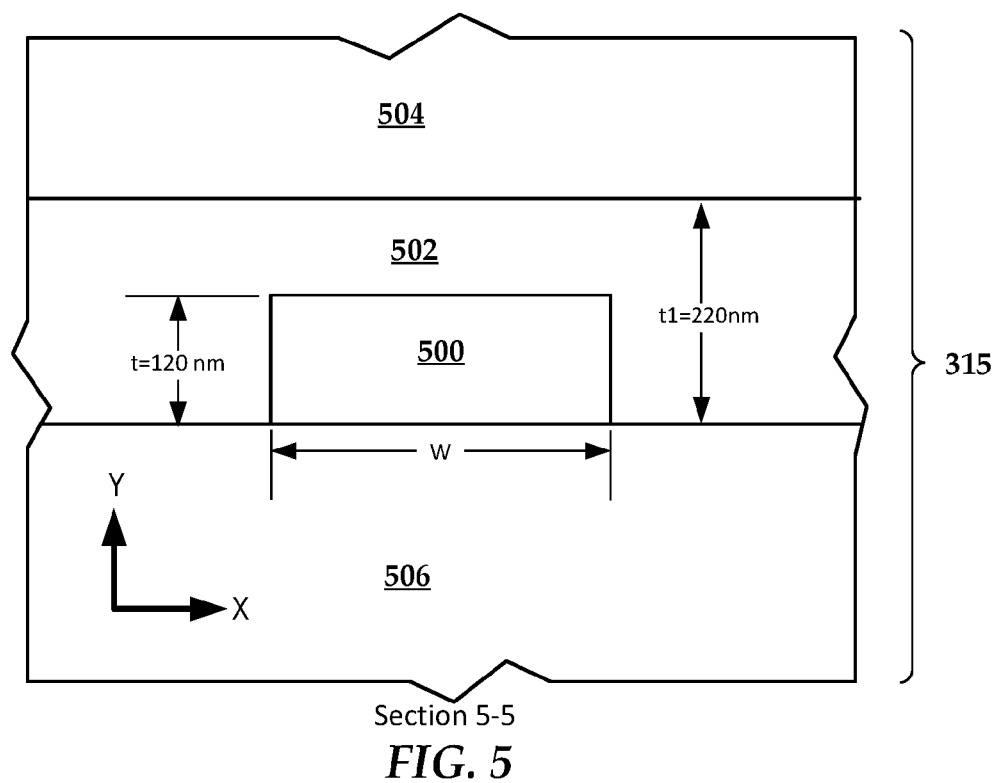
FIG. 5 is a cross-sectional view corresponding to section 5-5 of FIG. 3.

In FIG. 4, a $Nb_2O_5$ core section 402 is shown deposited on a silicon oxynitride (SiONx) assistant layer 400 and surrounded on the top and sides by an $Al_2O_3$ side cladding layer 406. These are covered on top by a silica top cladding layer 408 and on the bottom by an alumina bottom cladding layer 404. In FIG. 5, the $Nb_2O_5$ core section 500 is shown deposited on a silica bottom cladding layer 506. These are covered on top by a silica top cladding layer 504 and on the bottom by a silica bottom cladding layer 506. It will be understood that sections with different reference numbers (e.g., core sections 402 and 500) may be formed contiguously using the same process steps.

In reference again to FIG. 3, the waveguide system 305 transitions between the two above-described cross-sectional profiles at interface 322. Prior to the interface 322, the assistant layer 400 is used to match the mode profile of the laser diode 302 and waveguide input coupler 304 normal to waveguide plane (along y-axis shown in FIGS. 3-5) for efficient coupling from the light source to the waveguide. A detailed mechanism for the input coupler and the assistant layer are described in commonly-owned U.S. Pat. No. 8,385,183 filed on Nov. 5, 2009. In the region before the interface 322, the $TE_{00}$-to-$TE_{10}$ mode conversion is completed via the branch waveguide 308.

After the interface 322, the bottom cladding layer may be replaced by silica of lower index refraction, for enhancing the index contrast between core and cladding to achieve tight s-bend. The use of the silica bottom cladding after the interface 322 also pushes the mode field onto the NFT region for NFT excitation efficiency. In this example, the NFT 318 is placed above the core and in the $Al_2O_3$ cladding layer. In this region, offset light path is realized by a polynomial spiral s-bend. The $Nb_2O_5$ core has index of refraction n=2.29, that of $Al_2O_3$ on the core n=1.63, that of bottom $Al_2O_3$ cladding n=1.65, that of silica n=1.46 and that of silicon oxynitride n=1.70. For these calculations, light wavelength in free space is λ=0.83 μm.

Figure 6:
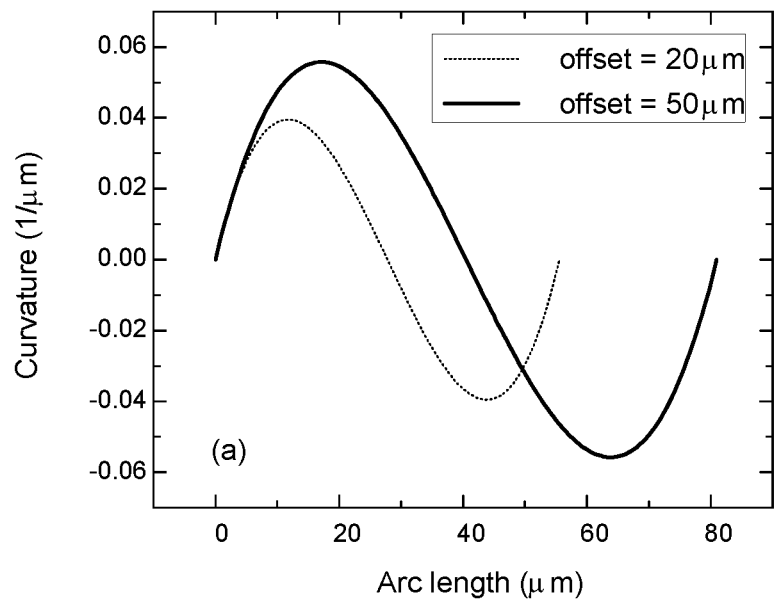
FIGS. 6 and 7 are graphs of waveguide geometries according to example embodiments.
Figure 7:
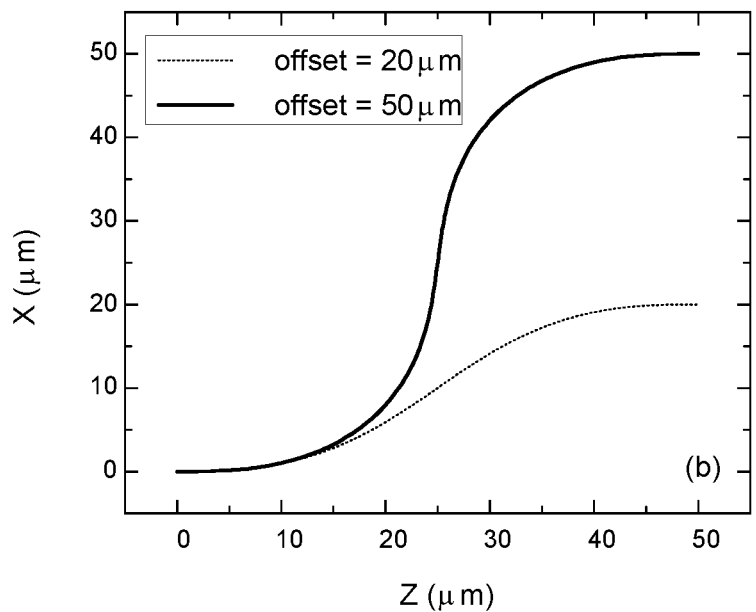
Figure 8:
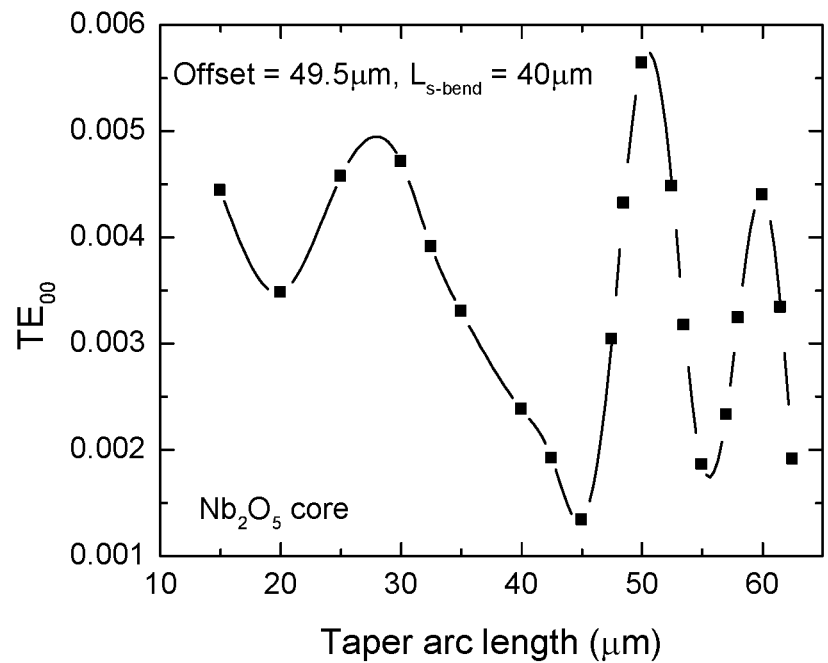
FIGS. 8-13 are plots of fundamental light mode excitation in bent waveguide geometries according to example embodiments.
Figure 9:
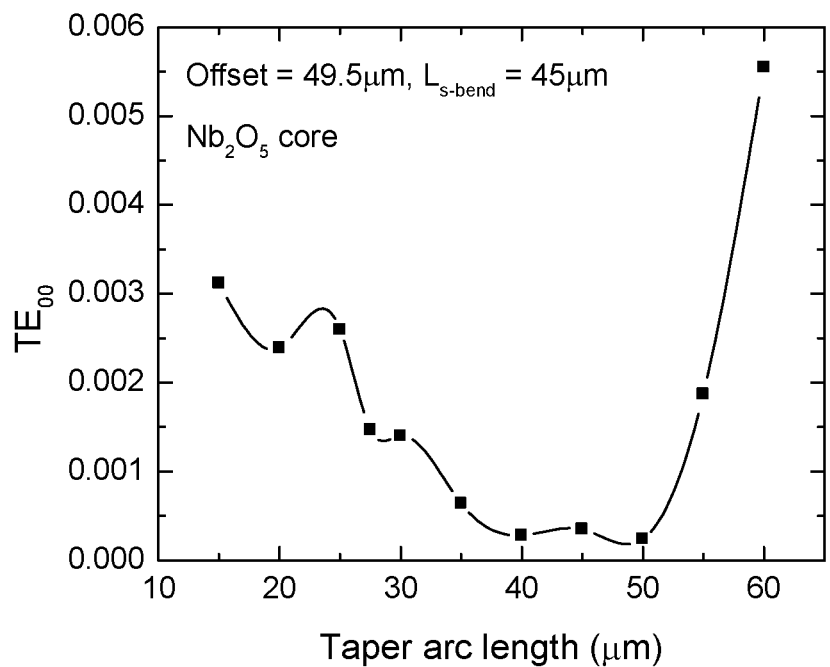
Figure 10:
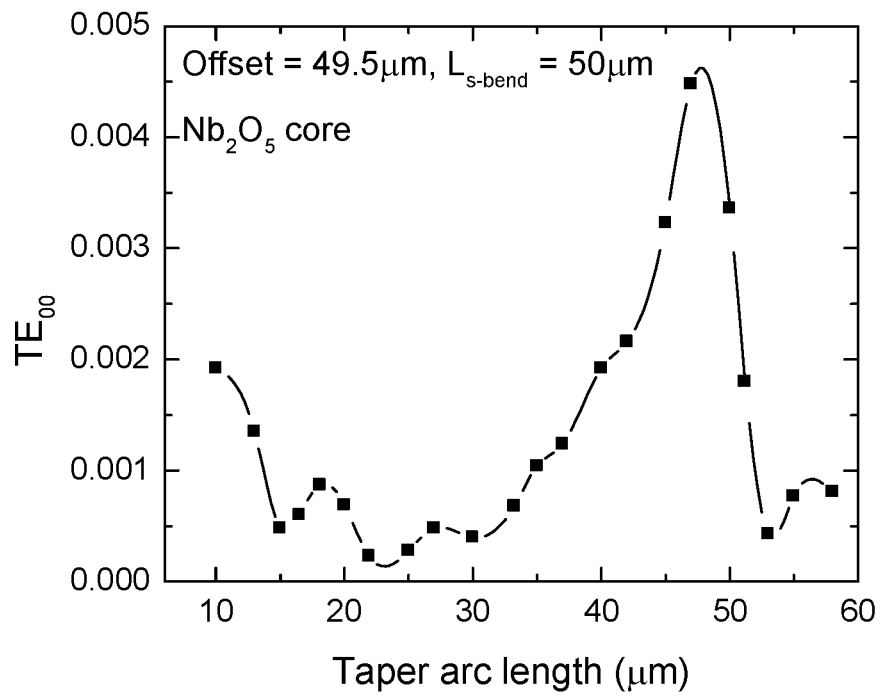
Figure 11:
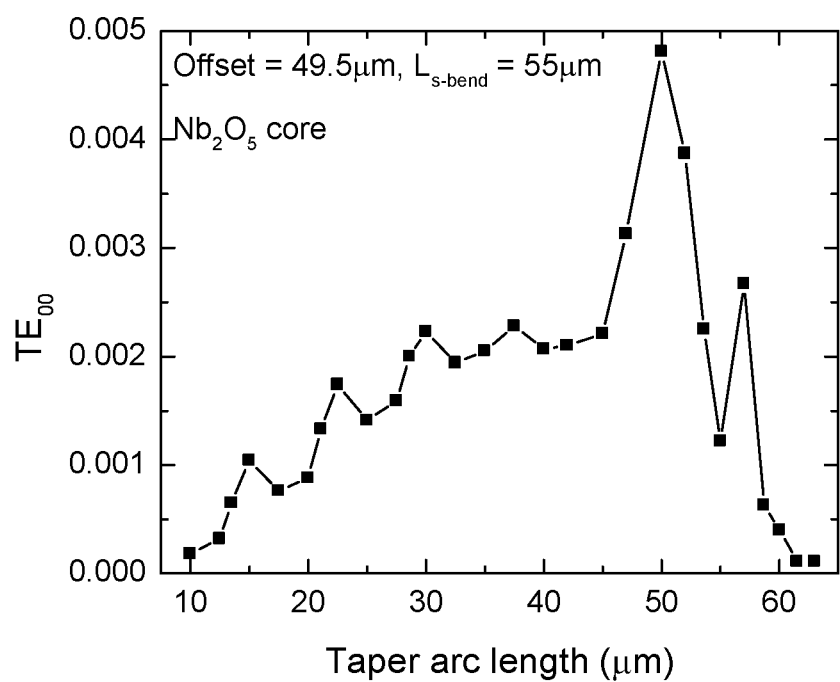

The waveguide core is $W_1$=1.02 μm wide (along the x-direction) at the joint of input waveguide and branch waveguide and $W_3$=0.86 μm wide at the output for NFT excitation. To fit the light delivery in the slider, the s-bend 316 has $L_{s\text{-}bend}$≤65 μm (see FIG. 3). The s-bend 316 tapers from $W_1$ to $W_2$=$W_3$, such that output channel waveguide 320 is a straight section with constant cross-track dimension $W_2$. The s-bend middle line 316a follows a polynomial spiral, determined by $L_{s\text{-}bend}$ and offset 324. The graphs in FIGS. 6 and 7 show the cases for $L_{s\text{-}bend}$=50 μm, offset=20 and 50 μm. The polynomial spiral s-bend connects with a straight waveguide at both end-points and has continuous change in curvature and in the derivative of curvature. So the bending curvature starts from 0, reaches maximum, back to 0 at the middle of the path, reaches minimum, and then back to 0 again. For a given $L_{s\text{-}bend}$, a larger offset needs smaller radius of curvature, resulting in greater $TE_{10}$-to-$TE_{00}$ conversion and also greater radiation loss.

For a tight s-bend, such as a s-bend with short length ($L_{s\text{-}bend}$) and large offset, even though a polynomial spiral s-bend is used, there are still some amounts of conversion from the $TE_{10}$ to $TE_{00}$ mode, in particular, if the contrast in the index of refraction between the core and cladding is not very high, for instance, using a $Ta_2O_5$ core. This s-bend taper is intended to nullify the $TE_{00}$ mode and recover the $TE_{10}$ mode. The method is to move the taper start position along the s-bend such that the $TE_{00}$ mode generated along the s-bend is nullified and the $TE_{10}$ mode is recovered at some optimal positions, or at some optimal taper arc lengths, defined as the arc length from the taper start position to the end of the s-bend.

The graphs in FIGS. 8-11 show the amount of $TE_{00}$ at the end of s-bend versus the taper arc length (to the end of the s-bend) for $L_{s\text{-}bend}$=40, 45, 50, and 55 μm at offset=49.5 μm. At the shortest length studied, $L_{s\text{-}bend}$=40 μm, large oscillations in the amount of $TE_{00}$ are observed. The oscillations at taper arc length>45 μm closely corresponds to the beating of $TE_{10}$ and $TE_{00}$ mode. Note that the waveguide of 1.02 μm (=$W_1$) wide supports three TE modes, $TE_{00}$, $TE_{10}$, and $TE_{20}$. So the second higher-order mode, $TE_{20}$, besides the fundamental $TE_{00}$ mode, could be also excited in the bend. At the end of s-bend, the waveguide can only support two TE modes, $TE_{00}$ and $TE_{10}$. For $L_{s\text{-}bend}$=45, 50, and 55 μm, small variations seem resulted from the beating of $TE_{10}$ and $TE_{00}$ mode, based on the period in oscillations.

From FIGS. 8-11, it can be seen that at some optimal taper arc lengths, the amount of $TE_{00}$ mode is minimized at each $L_{s\text{-}bend}$. At $L_{s\text{-}bend}$=45, 50, and 55 μm, the minimum $TE_{00}$ is only ~0.02%, i.e., −37 dB, and the s-bend transmission is better than 99.5%. At $L_{s\text{-}bend}$=40 μm, the minimum $TE_{00}$ is also low, ~0.13% and transmission is 99.3%. In practice it may be preferable to use Ls-bend≥50 μm for this particular configuration of materials and light source.

The calculation was also performed on waveguide with tantalum pentoxide ($Ta_2O_5$) core. The core is 140-nm thick and has an index of refraction n=2.065 at light wavelength λ=0.83 μm, which is 10% lower than that of $Nb_2O_5$. At the joint of the input coupler and branch waveguide, the core is $W_1$=1.2 μm wide. It also supports three TE modes at this width and with silica as the bottom cladding layer. The optimal core width for NFT excitation is the same as that for $Nb_2O_5$ core, $W_3$=0.86 μm. For $Ta_2O_5$ core, the fundamental transverse magnetic mode, $TM_{00}$, and the first-higher order mode $TE_{10}$ has nearly the same effective mode index at waveguide core width=1.03 μm.

Figure 12:
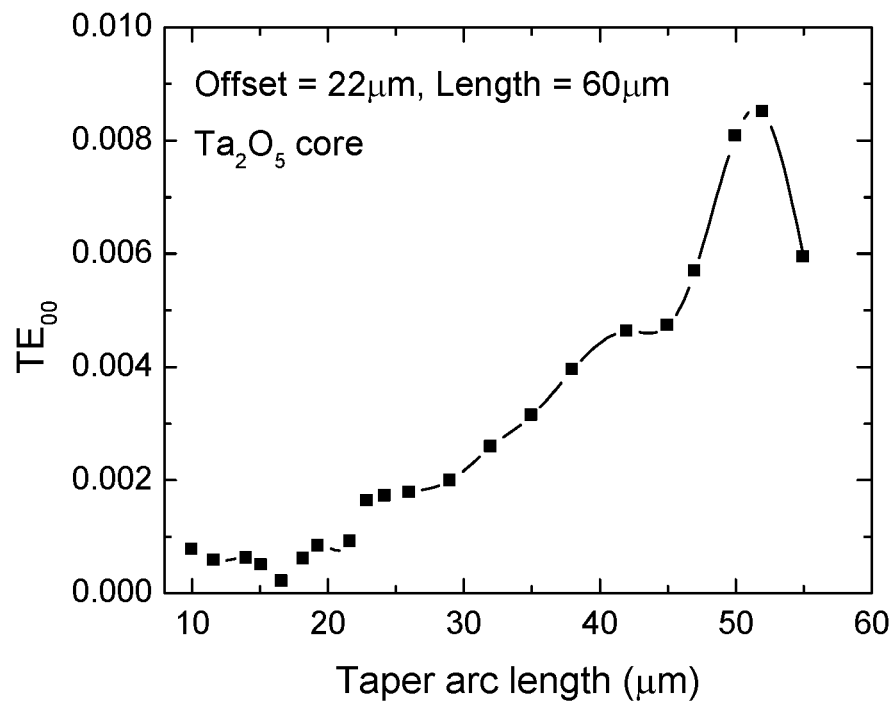
Figure 13:
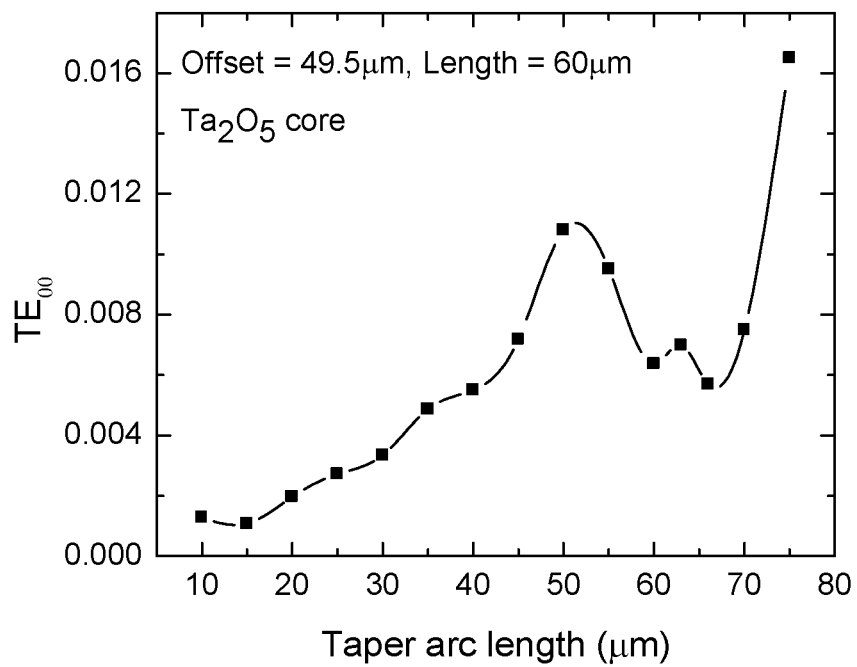

Due to the waveguide asymmetry in the refractive index along y direction, the $TM_{00}$ and $TE_{10}$ mode are weakly coupled at core width around 1.03 μm and $TE_{10}$-to-$TM_{00}$ conversion occurs. To avoid this complexity, the end width of the s-bend is chosen to be $W_2$=1.08 μm. An additional short taper, for instance, 5-10 μm, could be added to taper the core width from $W_2$ to $W_3$, such that output channel waveguide 320 is a tapered section. The graphs in FIGS. 12 and 13 show the modeling for offset=22 and 49.5 μm at Ls-bend=60 μm. At offset=22 μm, the minimum $TE_{00}$ is only 0.02% at the optimal taper arc length≈17 μm and the transmission over the s-bend is 99.7%; at offset=49.5 μm, the $TE_{00}$ is increased but still low, ~0.11% at the optimal taper arc length≈13 μm and transmission is 95.8%.

Figure 14:
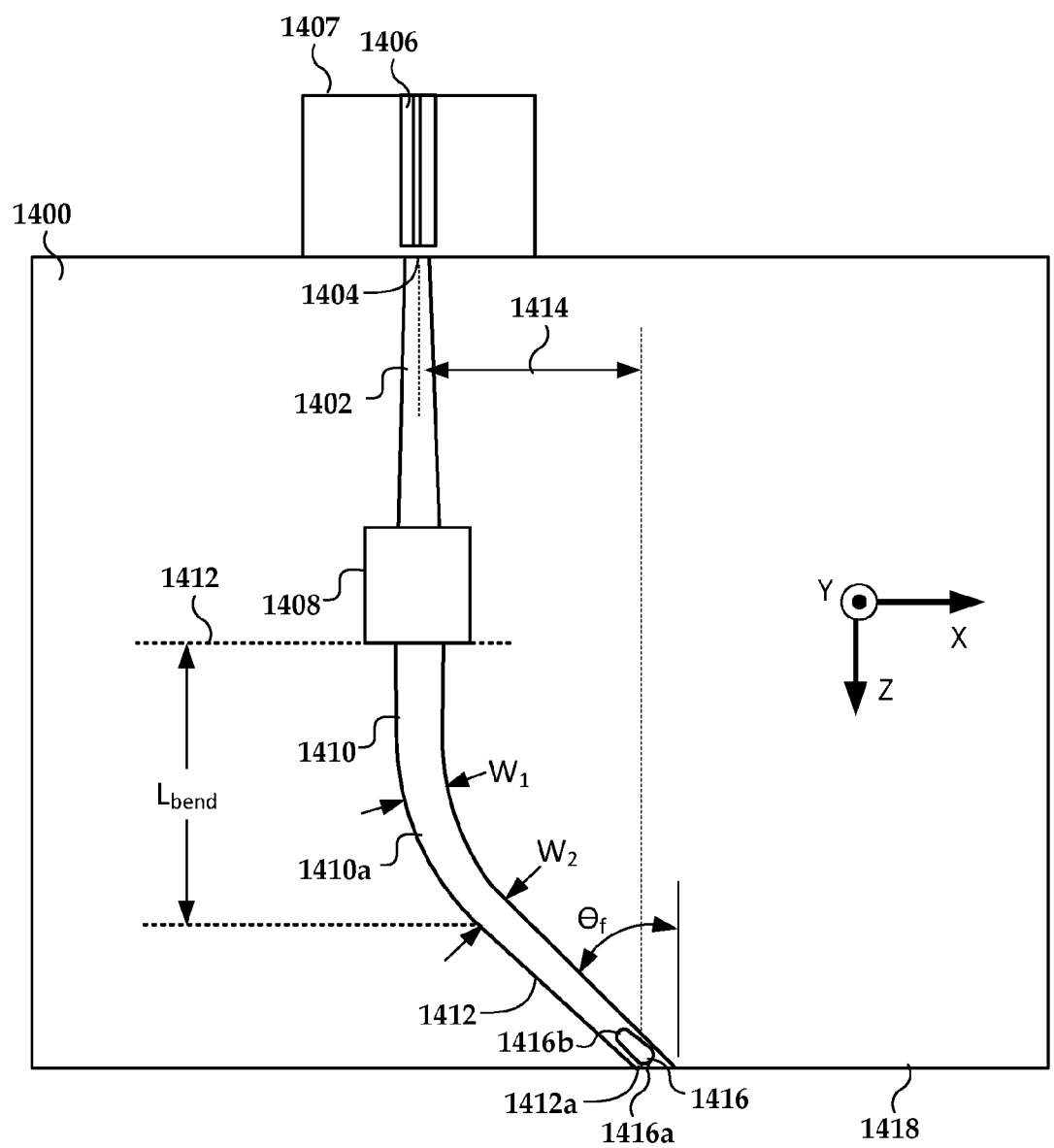
FIG. 14. is a substrate-parallel plane view showing geometry of a slider-integrated waveguide system according to another example embodiment.

While the embodiments above describe an s-bend waveguide, a tapered curve may be used in other waveguide configurations to minimize the generation of unwanted modes. In FIG. 14, diagram shows a substrate-parallel plane of a read/write head 1400 according to another example embodiment. An input coupler 1402 includes a facet 1404 that receives light from an energy source 1406 (e.g., laser diode mounted to submount 1407) of the read/write head 1400 at a fundamental mode (e.g., $TE_{00}$). A mode converter 1408 converts light from the fundamental mode to a higher-order mode (e.g., $TE_{10}$). The input coupler 1402 and mode converter 1408 may be configured as described above, e.g., in relation to FIGS. 3-5.

A bent waveguide 1410 is coupled to the mode converter 1408 at an interface 1412. The bent waveguide 1410 includes a curve 1410a with a taper (W1≠W2) that nullifies the fundamental mode generated in the curve 1401a and matches phases between the fundamental and the first higher-order mode to recover the first higher-order mode in an output of the bent waveguide 1410. The output of the bent waveguide 1410 is coupled to an output waveguide 1412. A termination 1412a of the output waveguide 1412 is offset from the facet 1404 of the input coupler 1402 by a distance 1414 in a cross-track direction. The output waveguide 1412 may be tapered or straight.

The output waveguide 1412 couples light into a near-field transducer 1416 near a media-facing surface 1418 of the read/write head. Note that in this example, the output waveguide 1412 is at a non-normal angle $\theta_f$ to the media-facing surface 1418. As such, the near-field transducer 1416 may include a peg 1416a that is offset relative to a centerline of an enlarged portion 1416 of the near-field transducer 1416. In some embodiments, a read/write head as shown in FIG. 14 may not use a mode converter, e.g., such that bent waveguide 1400 propagates in a fundamental $TE_{00}$ mode. Because $TE_{00}$ mode confinement is tighter than $TE_{10}$ mode, the conversion of $TE_{00}$ to $TE_{10}$ mode may not be as substantial as in the cases discussed above. Nonetheless, a $W_1$ to $W_2$ taper in such a case can nullify a $TE_{10}$ mode generated along the bend and recover a $TE_{00}$ mode at the output end of the bent waveguide 1410.

Figure 15:
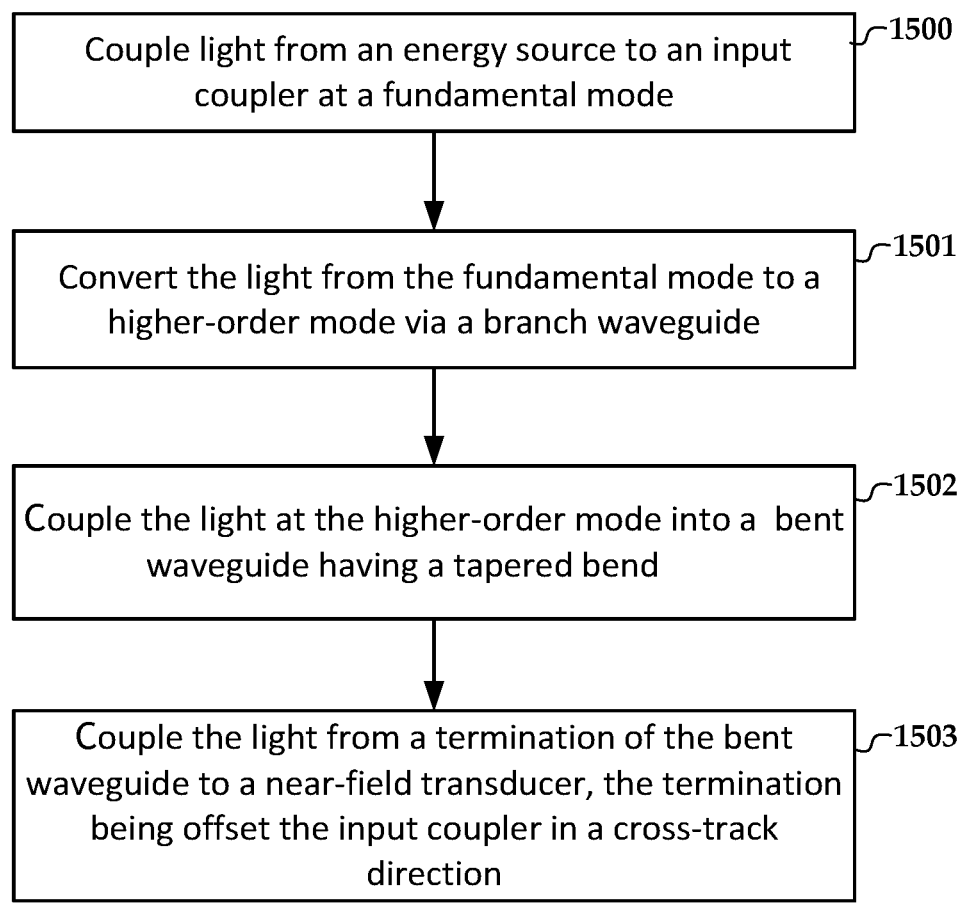
FIG. 15 is a flowchart illustrating a method according to an example embodiment.

In FIG. 15, a flowchart illustrates a method according to an example embodiment. The method involves coupling 1500 light from an energy source of a read/write head to a facet of an input coupler at a fundamental mode. The light is converted 1501 from the fundamental mode to a higher-order mode via a mode converter coupled proximate the input coupler at an interface. The light is coupled 1502 at the higher-order mode into bent waveguide (e.g., single bend, s-bend) having a bend/curve with a taper that matches the phase between the first higher-order mode and the fundamental mode. This matching nullifies the fundamental mode generated in the bent waveguide and recovers the first higher mode in an output of the bent waveguide. The light from the output of the bent waveguide is coupled 1503 to a near-field transducer of the read/write head. The termination is offset from the facet of the input coupler in a cross-track direction.

In summary, the methods and apparatuses described above utilize an offset light path that fits on a compact HAMR slider. Light is coupled into a fundamental mode of waveguide input coupler and in the same time converts to $TE_{10}$ mode. The $TE_{10}$ mode propagates through an s-bend to achieve offset light path, with $TE_{10}$-to-$TE_{00}$ conversion lower than 0.1% on and even down to 0.02% on $Nb_2O_5$ core at the maximum offset interested, using a polynomial spiral path s-bend with optimal tapering.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head, comprising:
   an input coupler comprising a facet that receives light from an energy source at a fundamental mode;
   a mode converter that converts light from the fundamental mode to a higher-order mode;
   a bent waveguide coupled to the mode converter at an interface, the bent waveguide comprising a curved path with a taper along the curved path, the taper nullifying the fundamental mode generated in the curved path and matching phases between the fundamental and the higher-order mode to recover the higher-order mode in an output of the bent waveguide; and
   a near-field transducer that receives the output of the bent waveguide, a center of the near-field transducer being offset from a corresponding center of the facet of the input coupler in a cross-track direction.

2. The write head of claim 1, wherein the mode converter comprises a branch waveguide coupled to the bent waveguide and the input coupler at the interface, the branch waveguide extending from the interface in a direction away from a media-facing surface of the write head.

3. The write head of claim 1, wherein the bent waveguide further comprises a first bend coupled between the mode converter and the curved path, the first bend comprising a curvature opposite that of the curved path.

4. The write head of claim 1, wherein the input coupler comprises:
   an assistant layer that matches a mode profile of the energy source and input coupler normal to a plane of the bent waveguide; and
   a bottom cladding layer below the assistant layer, the bottom cladding layer formed of a first material.

5. The write head of claim 1, wherein the taper comprises a wider cross-track dimension proximate the interface to a narrower cross-track dimension proximate a termination of the bent waveguide.

6. The write head of claim 1, further comprising an output waveguide extending from a termination of the bent waveguide to a media-facing surface of the write head.

7. The write head of claim 6, wherein the output waveguide is at a non-normal angle to the media-facing surface where the output waveguide meets the media-facing surface.

8. A method comprising:
   coupling light from an energy source of a write head to a facet of an input coupler at a fundamental mode
   converting the light from the fundamental mode to a higher-order mode via a mode converter coupled proximate the input coupler at an interface;
   coupling the light at the higher-order mode into a bent waveguide comprising a taper along a curved path that matches phases between the fundamental mode and the higher-order mode to nullify the fundamental mode generated in the bent waveguide and recover the higher-order mode in an output of the bent waveguide; and
   coupling the output of the bent waveguide to a near-field transducer of the write head, a center of the output of the bent waveguide being offset from a corresponding center of the facet of the input coupler in a cross-track direction.

9. The method of claim 8, wherein the bent waveguide comprises a spiral s-bend waveguide.

10. The method of claim 8, further comprising pushing a mode field of the light onto the near-field transducer via a cladding layer of lower index refraction than a first cladding layer proximate the input coupler.

11. The method of claim 8, wherein coupling the light to the near-field transducer comprises coupling the light via a straight output waveguide extending from a termination of the bent waveguide to a media-facing surface of the write head, the straight output waveguide having a constant cross-track width equal to a cross-track dimension of the output of the bent waveguide.

12. The method of claim 8, wherein coupling the light to the near-field transducer comprises coupling the light via a tapered output waveguide extending from a termination of the bent waveguide to a media-facing surface of the write head.

13. A write head, comprising:
   an input coupler comprising a facet that receives light at a fundamental mode from an energy source;
   an s-bend waveguide comprising a first bend coupled to the input coupler at an interface and a second bend comprising a taper, the second bend extending from the first bend to a termination of the s-bend waveguide proximate a near-field transducer of the write head, the second bend, the termination being offset from the facet of the input coupler in a cross-track direction; and
   a branch waveguide coupled to the s-bend waveguide and the input coupler proximate the interface, the branch waveguide extending away from a media-facing surface of the write head and converting the light from the fundamental mode to a higher-order mode that is coupled through the s-bend waveguide.

14. The write head of claim 13, wherein the s-bend waveguide comprises a polynomial spiral.

15. The write head of claim 13, wherein the taper of the s-bend waveguide nullifies the fundamental mode generated along the s-bend waveguide and recovers the higher-mode mode in an output of the s-bend waveguide by matching phase between the fundamental mode and the higher-order mode.

16. The write head of claim 13, wherein the input coupler comprises:
- an assistant layer that matches a mode profile of the energy source and input coupler normal to a plane of the s-bend waveguide; and
- a bottom cladding layer below the assistant layer, the bottom cladding layer formed of a first material.

17. The write head of claim 16, wherein the bottom cladding layer transitions to a second material of lower index refraction than the first material proximate the s-bend waveguide.

18. The write head of claim 13, wherein the fundamental mode comprises a $TE_{00}$ mode and the higher-order mode comprises a $TE_{10}$ mode.

19. The write head of claim 13, wherein the taper comprises a wider cross-track dimension proximate the first bend to a narrower cross-track dimension proximate the termination.

20. The write head of claim 13, further comprising an output waveguide extending from a termination of the s-bend waveguide to a media-facing surface of the write head.

* * * * *